United States Patent
Liu et al.

(10) Patent No.: US 11,995,632 B1
(45) Date of Patent: May 28, 2024

(54) POINT OF SALE TERMINAL OF A MOBILE DEVICE

(71) Applicant: American Express Travel Related Services Company, Inc., New York, NY (US)

(72) Inventors: Hong Liu, Union City, CA (US); Keshav A. Narsipur, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 18 days.

(21) Appl. No.: 17/371,256

(22) Filed: Jul. 9, 2021

Related U.S. Application Data

(63) Continuation of application No. 15/365,598, filed on Nov. 30, 2016, now abandoned.

(51) Int. Cl.
*G06Q 20/32* (2012.01)
*G06Q 20/20* (2012.01)
(Continued)

(52) U.S. Cl.
CPC ......... *G06Q 20/3223* (2013.01); *G06Q 20/20* (2013.01); *G06Q 20/3278* (2013.01); *G06Q 20/3674* (2013.01); *G06Q 20/4014* (2013.01)

(58) Field of Classification Search
CPC .............. G06Q 20/3223; G06Q 20/20; G06Q 20/3278; G06Q 20/3674; G06Q 20/4014
(Continued)

(56) References Cited

U.S. PATENT DOCUMENTS

| 2009/0307133 A1 | 12/2009 | Holloway et al. |
| 2011/0191252 A1 | 8/2011 | Dai |

(Continued)

FOREIGN PATENT DOCUMENTS

| CN | 104903925 | 9/2015 |

OTHER PUBLICATIONS

McDonald, Nicholas. High-Performance Service-Oriented Computing. Stanford University ProQuest Dissertations Publishing, 2016. (Year: 2016).*

(Continued)

*Primary Examiner* — Florian M Zeender
*Assistant Examiner* — Fawaad Haider
(74) *Attorney, Agent, or Firm* — Thomas | Horstemeyer, LLP

(57) ABSTRACT

Disclosed are various embodiments for a point of sale terminal for a mobile device. In some embodiments, a system comprises a computing device that is configured to receive a transmission for a mobile device from a merchant and establish a first network connection with a virtual terminal system for the merchant. The virtual terminal system is activated and a first identifier for the mobile device is received through the first network connection. The first identifier is matched with a second identifier from an information database. A second network connection is established with the POS terminal for the second identifier. A payment token for a transaction is received from the POS terminal through the second network connection. A transaction acceptance is communicated through the first network connection to the virtual terminal system for the merchant.

20 Claims, 3 Drawing Sheets

(51) Int. Cl.
*G06Q 20/36* (2012.01)
*G06Q 20/40* (2012.01)

(58) Field of Classification Search
USPC .......................................................... 705/44
See application file for complete search history.

(56) References Cited

U.S. PATENT DOCUMENTS

| | | | |
|---|---|---|---|
| 2013/0086375 A1 | 4/2013 | Lyne et al. | |
| 2013/0282588 A1 | 10/2013 | Hruska | |
| 2015/0081461 A1 | 3/2015 | Adrangi et al. | |
| 2015/0324788 A1* | 11/2015 | Graylin | G06Q 20/409 |
| | | | 705/67 |
| 2016/0019536 A1 | 1/2016 | Ortiz et al. | |
| 2016/0180320 A1* | 6/2016 | Klingen | G06Q 20/425 |
| | | | 705/44 |
| 2016/0364723 A1* | 12/2016 | Reese | G06Q 20/202 |
| 2017/0228723 A1* | 8/2017 | Taylor | H04L 63/123 |
| 2017/0337542 A1 | 11/2017 | Kim et al. | |

OTHER PUBLICATIONS

Isaac, Jesús Téllez; Zeadally, Sherali. Design, implementation, and performance analysis of a secure payment protocol in a payment gateway centric model. Computing. Archives for Informatics and Numerical Computation; Wien vol. 96, Iss. 7, (Jul. 2014): 587-611. (Year: 2014).*
International Preliminary Report on Patentability dated Nov. 5, 2018 in PCT Application No. PCT/US2017/057438.
International Search Report and Written Opinion dated Jun. 7, 2018 in Application No. PCT/US17/57438.

* cited by examiner

POINT OF SALE TERMINAL OF A MOBILE DEVICE

CROSS REFERENCE TO RELATED APPLICATIONS

This application is a continuation of, claims priority to, and the benefit of, U.S. Ser. No. 15/365,598 filed Nov. 30, 2016, and entitled "MOBILE PAYMENT SYSTEM," which is incorporated by reference herein in its entirety.

FIELD

The present disclosure generally relates to systems and methods for a mobile payment system.

BACKGROUND

A consumer conducting a transaction with a merchant, whether online or in-person, may be required to provide their transaction account information associated with a transaction account. Traditionally, the transaction account information may be provided to the merchant during in-person transactions (i.e., a consumer is present at a physical merchant location) via an electronic wallet comprising a virtual payment instrument, or via a physical payment instrument (e.g., a credit card or debit card) interacting with a point-of-sale (POS) terminal at a physical merchant location. During e-commerce transactions (i.e., transactions conducted online, for example, through a merchant's website), the consumer may enter transaction account information into a payment web page. Backend transfer of account information between a merchant, an electronic wallet, and/or any other systems or servers may take place in order to complete the transaction, which may cause the information to have exposure risks.

An issuing bank may issue a physical payment instrument or electronic wallet with secret payment credentials that are used to compute a cryptogram over the transaction details (e.g. transaction amount, date, the merchant information, etc.). Therefore, the in-person transaction, in which the physical payment instrument or electronic wallet is presented to a POS terminal at a physical merchant location, is with nonrepudiation assurance and may have a low fraud risk.

SUMMARY

A system, method, and article of manufacture (collectively, "the system") are disclosed relating to a mobile payment system. In various embodiments, the system may be configured to perform operations including receiving, by a processor, a device identifier to create a received device identifier, the received device identifier being associated with a personal POS terminal on a device associated with a consumer; matching, by the processor, a stored device identifier with the received device identifier; activating, by the processor, the personal POS terminal on the device associated with the stored device identifier; and/or receiving, by the processor and via the personal POS terminal, a payment token associated with a transaction account associated with the consumer for a transaction.

In various embodiments, the device identifier may be requested from the consumer. In various embodiments, the consumer may enter a phone number as the device identifier into a virtual terminal system. The virtual terminal system may be integrated into an online store associated with a merchant. In various embodiments, the personal POS terminal may generate the device identifier and send the device identifier to the processor. In various embodiments, the operations may further comprise instructing, by the processor, the device to display transaction details for the transaction in response to the activating the personal POS terminal on the device. The operations may further comprise receiving, by the processor, an action response, wherein the action response includes the consumer accepting or rejecting the transaction in response to the activating the personal POS terminal. In various embodiments, the operations may further comprise requesting, by the processor, a payment from the transaction account. In various embodiments, the payment token may be generated at least one of by a payment instrument associated with the consumer physically being near or contacting the device, or from an electronic wallet in communication with the personal POS terminal. In various embodiments, the personal POS terminal may be downloaded to the device.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The present disclosure generally relates to regulating transactions by receiving and analyzing transaction identification information. The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
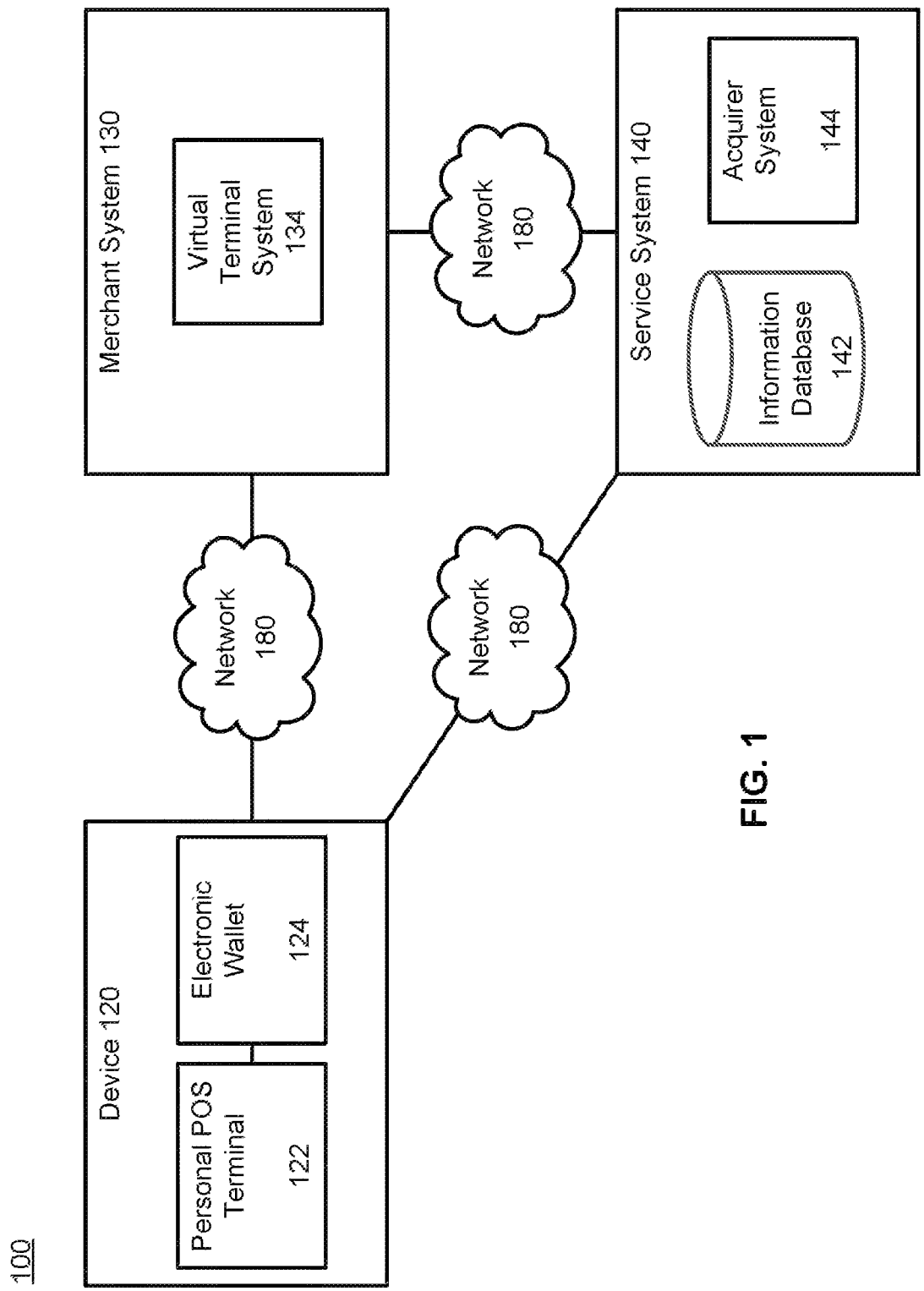
FIG. 1 shows an exemplary mobile payment system, in accordance with various embodiments.

With reference to FIG. 1, an exemplary mobile payment system is disclosed, in accordance with various embodiments. System 100 may allow a consumer to have a checkout experience similar to conducting a transaction at a physical merchant location. Therefore, transactions enabled by system 100 may have the same or similar level of low fraud risk, nonrepudiation assurance as an in-person transaction at a physical POS terminal. For example, system 100 may allow a consumer to pay for a transaction by presenting a physical payment instrument to the consumer's device (i.e., device 120, such as a mobile device) having a mobile, personal point-of-sale (POS) terminal. In various embodiments, the personal POS terminal may be an app on a device. The personal POS terminal may include other software that is used by the mobile device and that provides POS functionality. The personal POS terminal may include hardware, a combination of hardware and software or all software. The consumer may also utilize a virtual payment instrument. The virtual payment instrument may be stored in an electronic wallet, wherein the electronic wallet may be in communication with the personal POS terminal, as described further herein.

In various embodiments, system 100 may comprise a device 120, a merchant system 130, and/or a service system 140. All or any subset of components of system 100 may be in communication with one another via a network 180. System 100 may allow integration between the various components. In various embodiments, integration may occur by one component of system 100 transmitting script to the other components, which the other components may download and/or execute. For example, service system 140 may transmit service script via network 180 to device 120 and/or merchant system 130. Device 120 and/or merchant system 130 may download and/or execute the service script from service system 140, thereby integrating service system 140 into device 120 and/or merchant system 130. For example, through integration between merchant system 130 and service system 140, service system 140 may provide merchant system 130 with virtual terminal system 134. System 100 may be computer-based, and may comprise a processor, a tangible non-transitory computer-readable memory, and/or a network interface. Instructions stored on the tangible non-transitory memory may allow system 100 to perform various functions, as described herein.

In various embodiments, device 120 may incorporate hardware and/or software components. For example, device 120 may comprise an operating system (e.g. ANDROID®). Device 120 may be any device that allows a user to communicate with network 180 (e.g., a personal computer, personal digital assistant (e.g., IPHONE®, BLACKBERRY®), tablet, cellular phone, and/or the like). Device 120 may be in communication with merchant system 130 and/or service system 140 via network 180. In various embodiments, device 120 may communicate with a physical transaction instrument, such as a physical payment instrument (e.g., via near field communication (NFC) by host card emulation (HCE) hardware and software on device 120) or an electronic wallet 124. Device 120 may participate in any or all of the functions performed by merchant system 130 and/or service system 140 via network 180.

Device 120 includes any device (e.g., personal computer, mobile device, etc.) which communicates via any network, for example such as those discussed herein. In various embodiments, device 120 may comprise and/or run a browser, such as MICROSOFT® INTERNET EXPLORER®, MOZILLA® FIREFOX®, GOOGLE® CHROME®, APPLE® Safari, or any other of the myriad software packages available for browsing the internet. For example, the browser may communicate with merchant system 130 via network 180 by using Internet browsing software installed in the browser. The browser may comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, mainframe computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various embodiments, browser may be configured to display an electronic channel.

In various embodiments, device 120 may comprise an electronic wallet 124. Electronic wallet 124 may be associated with a consumer, and may store transaction account information associated with one or more transaction accounts (i.e., a credit card, debit card, etc.) associated with the consumer. In various embodiments, electronic wallet 124 may comprise software and/or hardware that facilitate individual in-person, e-commerce, and/or m-commerce transactions. As such, a consumer may use the consumer's electronic wallet 124 to complete a transaction with a merchant, for example, by selecting a transaction account within electronic wallet 124 to use for payment to complete the transaction. Transactions may be facilitated by electronic wallet 124 computing a cryptogram over transaction details of the transaction (e.g., merchant identification, products/services being purchased, monetary amount, date of transaction, etc.), aggregating the consumer's payment and/or billing information, serving as the merchant of record, and/or passing the consumer's payment information, transaction account information, and/or billing information to merchant system 130 and/or service system 140.

In various embodiments, merchant system 130 may incorporate hardware and/or software components. For example, merchant system 130 may comprise a server appliance running a suitable server operating system (e.g., Microsoft Internet Information Services or, "IIS"). Merchant system 130 may be in communication with service system 140 and (indirectly) with device 120 (via service system 140). In various embodiments, merchant system 130 may be integrated with service system 140. Merchants having merchant systems 130 may integrate with service system 140, allowing service system 140 to accept and/or process payments for the merchant in response to consumers completing transactions with the merchant. In various embodiments, merchant system 130 may comprise a virtual terminal system 134, which may comprise a graphical user interface ("GUI") software integrated with an online store on which consumers may shop for and purchase goods or services from the merchant.

In various embodiments, merchant system 130 may comprise a virtual terminal system 134, which may be the system through which the merchant may conduct a payment transaction with a consumer (e.g., an e-commerce or m-commerce transaction). Virtual terminal system 134 may be accessed by a consumer at a checkout page on a merchant website. In various embodiments, virtual terminal system 134 may be one payment method option of multiple payment method options, from which a consumer may choose at a merchant checkout page. In various embodiments, virtual terminal system 134 may offer a mobile payment method with EMV standard transaction security and nonrepudiation using a personal point-of-sale ("POS") terminal on device 120, as described further herein. In response to the payment method by virtual terminal system 134 being selected by the consumer, a GUI may be activated as the virtual terminal system 134, and may prompt the consumer to enter a device identifier associate with the consumer's device 120 to complete some or all of the transaction. The association between the device identifier entered and a personal POS terminal 122 on a device 120 may be achieved by communicating via network 180 the entered device identifier with the transaction details (e.g. transacted amount, merchandize and merchant information etc.) to service system 140, which enables the secure data exchange with personal POS terminal 122. The GUI of virtual terminal system 134 may then instruct the consumer to attend to the consumer's device 120 (e.g., a mobile device, mobile telephone, tablet, etc.) to complete some or all of the transaction. Virtual terminal system 134 and the GUI may be provided by service system 140 through the integration between merchant system 130 and service system 140. Virtual terminal system 134 may be a part of, and in communication with, service system 140.

In various embodiments, device 120 may comprise a personal POS terminal 122, which may be provided by service system 140 and/or downloaded (e.g., from an application store). Personal POS terminal 122 may be a part of, and in communication with, service system 140, and is used by a consumer using device 120. Personal POS terminal 122 may be a system (or an application on a mobile device) through which a consumer may pay for transactions by providing a payment token to personal POS terminal 122. Personal POS terminal 122 may comprise a payment instrument acceptance device ("PIAD"), for payments by a physical payment instrument (e.g., a charge card) associated a transaction account. In order to avoid stringent security and regulation requirements, personal POS terminal 122 may be simplified to always precede the payment transaction with requesting the issuing bank's online authorization so personal POS terminal 122 is not required to store sensitive data used for offline approval. Furthermore, in various embodiments, personal POS terminal 122 may not support explicit card holder verification, e.g., offline or online personal identification number (PIN) in the EMV specification, as user's unlocking device 120 to interact with personal POS terminal 122 may provide user verification at the device level.

In various embodiments, personal POS terminal 122 may interface with electronic wallet 124 to utilize a virtual payment instrument (e.g., those stored in electronic wallet 124) associated with a transaction account as the payment instrument.

In various embodiments, the PIAD may be configured to receive a payment token from a physical payment instrument (e.g., charge card) being in contact with or proximity to device 120 by exchanging Application Protocol Data Unit (APDU) via NFC. Device 120 may comprise hardware allowing the NFC communication feature, such as a host card emulation (HCE) device. PIAD may utilize the hardware allowing NFC communication to receive the payment token from the physical payment instrument during a transaction.

In various embodiments, service system 140 may comprise hardware and/or software capable of storing data and/or analyzing information. Service system 140 may comprise a server appliance running a suitable server operating system (e.g., MICROSOFT INTERNET INFORMATION SERVICES or, "IIS") and having database software (e.g., ORACLE) installed thereon. Service system 140 may be in electronic communication with device 120 and/or merchant system 130. In various embodiments, service system 140 may securely associate virtual terminal system 134 at merchant system 130 for a transaction (e.g., for a current checkout session) with personal POS terminal 122 of device 120 of the individual consumer in the transaction. In various embodiments, service system 140 may be associated with an acquirer service that deploys point-of-sale terminals at member merchants of the acquirer service. In such embodiments, service system 140 may be responsible for settlement with issuing banks that issue the consumer's transaction account.

In various embodiments, service system 140 may comprise an information database 142. Information database 142 may store one or more device identifiers, wherein each device identifier is associated with at least one device 120, and each device 120 is associated with a consumer or consumer profile. In various embodiments, the consumer may pre-register his or her device 120 with service system 140 and/or information database 142. In such a case, service system 140 may assign a device identifier to the consumer's device 120, use the device identifier to link with the device 120 belonging to the consumer, and securely associate and communicate the transaction data between device 120 and service system 140. In various embodiments, in which the consumer has not pre-registered his or her device 120 with service system 140, the consumer may use a mobile number associated with the device 120 in lieu of the device identifier. Upon receiving the service request with the mobile number (which the consumer may input into virtual terminal system 134 during a transaction), service system 140 may communicate with the device 120 (e.g. via tele network) and may prompt the consumer to download and install personal POS terminal 122 onto device 120, if having not done so, and assign a device identifier to the device 120 for storage in information database 142.

In various embodiments, service system 140 may comprise an acquirer system 144. In various embodiments, acquirer system 144 may be separate from service system 140. Acquirer system 144 may be configured to communicate the payment token received by personal POS terminal 122 to the issuing bank associated with the transaction instrument used in the transaction for authorization. In various embodiments in which acquirer system 144 is part of service system 140, service system will communicate the payment token received by personal POS terminal 122 to the associated issuing back. In various embodiments in which acquirer system 144 is separate from service system 140, service system 140 may communicate the payment token to the separate acquirer system, which may then further process the token (i.e., send to associated issuing bank for authorization).

In various embodiments, network 180 may be an open network or a closed loop network. The open network may be a network that is accessible by various third parties. In this regard, the open network may be the internet, a typical transaction network, and/or the like. Network 180 may also be a closed network in response to acquirer system 144 being a part of service system 140. In this regard, network 180 may be a closed loop network like the network operated by American Express and/or an acquirer. Moreover, the closed loop network may be configured with enhanced security and monitoring capability. In this regard, network 180 may be configured to monitor users on network 180. In this regard, the closed loop network may be a secure network and may be an environment that can be monitored, having enhanced security features.

Figure 2:
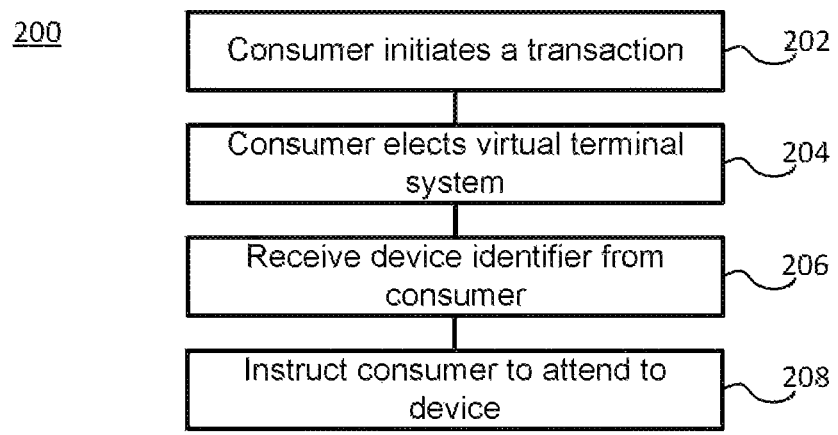
FIG. 2 shows a flowchart depicting an exemplary method for initiating a transaction using a mobile payment system, in accordance with various embodiments.
Figure 3:
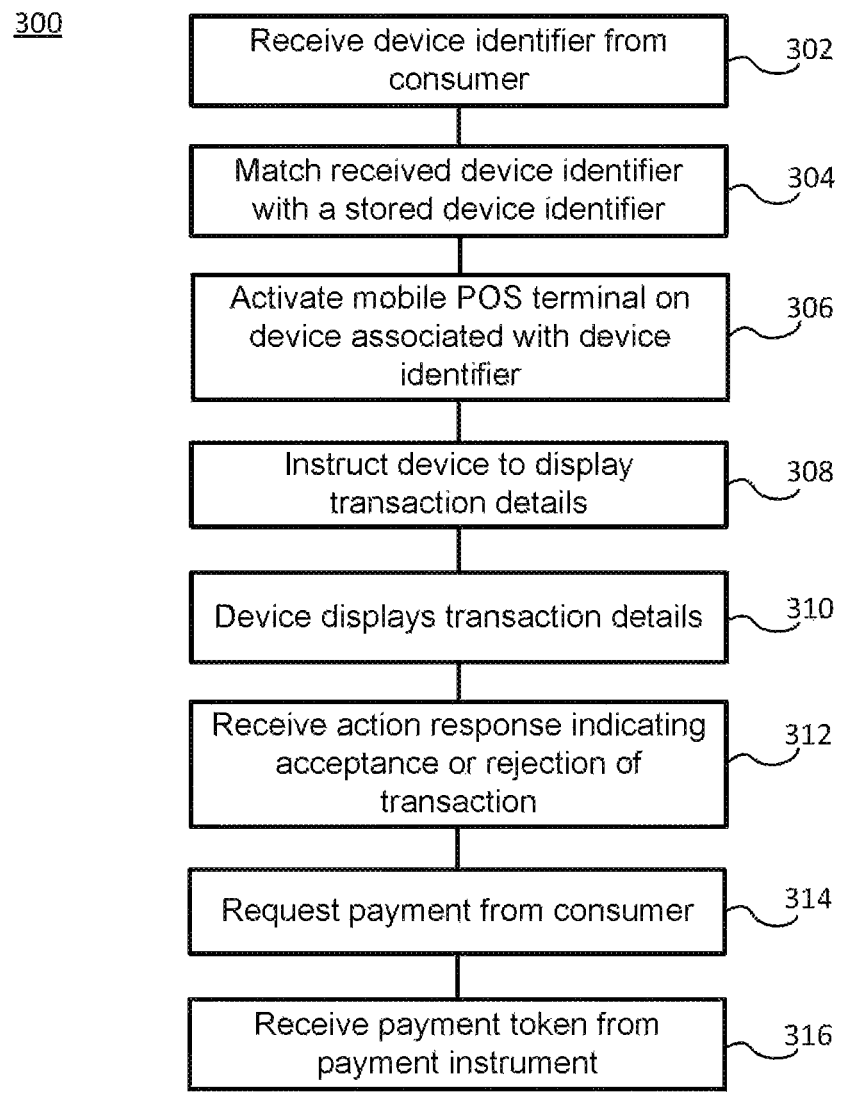
FIG. 3 shows a flowchart depicting an exemplary method for conducting a transaction using a mobile payment system, in accordance with various embodiments.

With respect to FIGS. 2-3, the process flows depicted are merely embodiments of various embodiments, and are not intended to limit the scope of the disclosure. For example, the steps recited in any of the method or process descriptions may be executed in any order and are not limited to the order presented. It will be appreciated that the description herein makes appropriate references not only to the steps and consumer interface elements depicted in FIGS. 2-3, but also to the various system components as described above with reference to FIG. 1.

According to various embodiments, FIG. 2 depicts an exemplary method 200 for initiating a transaction (e.g., an e-commerce or m-commerce transaction) using a mobile payment system, such as system 100. In various embodiments, with combined reference to FIGS. 1 and 2, a consumer may initiate a transaction (step 202) with a merchant (e.g., via an online store associated with the merchant), and may elect virtual terminal system 134 (step 204) as the system to facilitate payment for the transaction.

In various embodiments, the merchant may have registered with service system 140, and service system 140 may provide to merchant system 130 virtual terminal system 134, and/or merchant system 130 may be in communication with virtual terminal system 134. In various embodiments, virtual terminal system 134 may display a GUI option to enter a device identifier and/or mobile number to complete the transaction via personal POS terminal 122.

In various embodiments, in response to the merchant having registered with service system 140, transmissions between components in system 100 may comprise a merchant identifier which identifies the merchant involved in the transaction. In response to identifying the merchant as a participating merchant, service system 140 may activate virtual terminal system 134 on merchant system 130. System 140 may assign an identifier, a configuration(s), and/or a script(s) necessary for virtual terminal system 134 to communication with service system 140. In various embodiments, virtual terminal system 134 may always or may periodically provide the GUI based on the consumer, geographic location, the amount of purchase, the items purchased and/or any other factors.

Virtual terminal system 134, through the GUI, may request a device identifier from the consumer that is associated with a device 120 associated with the consumer. In various embodiments, a device identifier may be any identifier associated with the consumer's device 120, such as a device identifier assigned in response to a consumer pre-registering his or her personal POS terminal 122 and/or device 120 with service system 140, or a telephone number if device 120 is a mobile telephone. In various embodiments, a device identifier may be assigned to multiple devices 120 associated with a consumer. A device identifier may also include a token that is generated.

In various embodiments, the consumer may provide the device identifier by inputting the device identifier into virtual terminal system 134. The consumer may also provide the device identifier by providing a biometric identifier associated with the consumer which has been associated with the device identifier and/or device 120. Virtual terminal system 134 may receive the device identifier (step 206). If the consumer has not registered his or her device 120 with service system 140, the device identifier may be a mobile phone number, and upon receipt of the mobile phone number, service system 140 may prompt device 120 to download personal POS terminal 122. A mobile phone number may be used as a device identifier regardless of whether the device 120 is pre-registered. In response to the consumer electing virtual terminal system 134 (step 204) and/or system 100 receiving the device identifier (step 206), virtual terminal system 134 and/or the GUI may instruct the consumer to attend to their device 120 (step 208). In various embodiments, the instructions for the consumer to attend to their device 120 may be general instructions for any device or specific to the device 120 associated with the device identifier.

According to various embodiments, FIG. 3 depicts an exemplary method 300 for conducting a transaction using a mobile payment system, such as system 100. In various embodiments, with combined reference to FIGS. 1 and 3, virtual terminal 134 may receive the device identifier (step 302) and transmit the device identifier to service system 140. Service system 140 may match the received device identifier with a stored device identifier (step 304) in information database 142. In response to matching the received device identifier with a stored device identifier (and retrieving the parameters associated with the associated device 120 and/or personal POS terminal 122), service system 140 may activate personal POS terminal 122 on the device 120 associated with the device identifier (step 306) (e.g., by presenting a push notification on device 120 to the matched personal POS terminal 122). In various embodiments, service system 140 may transmit a command to activate and/or open personal POS terminal 122 (which may be a software application on the device listening on specific port). Therefore, personal POS terminal 122 may automatically activate on the consumer's device without consumer acting on the device 120. In various embodiments, virtual terminal system 134 and/or the GUI may instruct the consumer to attend to their device 120 (step 208), and in response, consumer may activate personal POS terminal 122 on the device 120.

In various embodiments, in response to personal POS terminal 122 being activated, service system 140 may instruct the device 120 to display the transaction details (step 308) (e.g., merchant identification, products/services being purchased, monetary amount, date of transaction, etc.). In response, personal POS terminal 122 and/or the device 120 may display the transaction details (step 310) on a display screen. In various embodiments, the consumer may be presented with an option to accept or reject the transaction by personal POS terminal 122. Consumer may accept or reject the transaction, and personal POS terminal 122 and/or service system 140 may receive an action response indicating whether the consumer accepted or rejected the transaction (step 312). In various embodiments, the consumer may input the action response into personal POS terminal 122 on device 120, and personal POS terminal 122 may transmit the action response to service system 140. In various embodiments, the consumer may implicitly accept a transaction by proceeding with the transaction checkout process.

In response to the consumer accepting the transaction, service system 140 and/or personal POS terminal 122 may request payment from the consumer (step 314) for the transaction. The consumer may either place a physical payment instrument (e.g., a credit or debit card) in proximity to or in contact with the PIAD of device 120 as described herein, from which personal POS terminal 122 will receive a payment token, or unlock electronic wallet 124 to pay with a virtual payment instrument stored in electronic wallet 124.

In various embodiments, the PIAD may be configured to generate and/or receive a payment token from a virtual payment instrument (step 316) by personal POS terminal 122 being in communication with electronic wallet 124. Electronic wallet may store one or more virtual payment instruments. In response to consumer electing to pay using a virtual payment instrument in electronic wallet 124, in various embodiments, electronic wallet 124 may require an account holder verification from the consumer, such as a passcode, password, a biometric identifier, or any other verification of the consumer associated with the virtual payment instrument, to unlock electronic wallet 124. Electronic wallet 124 may receive the account holder verification and compare the account holder verification to a stored account holder verification(s). In response to the account holder verification from the consumer matching a stored account holder verification, personal POS terminal 122 may generate and/or receive a payment token from the virtual payment instrument (step 316). Personal POS terminal 122, in response to receiving the payment token, may transmit the payment token to service system 140. A payment token may comprise a unique identifier associated with the transaction account and/or payment instrument used for the transaction, transaction and merchant data/identifiers, and a cryptogram over the transaction details to secure the payment token from unauthorized alternation, and to provide authenticity of the presence of the payment instrument issued by issuing banks. Service system 140 may transmit the received payment token to a separate acquirer service for onward processing. If service system 140 comprises acquirer system 144, service system 140 may process the payment transaction by affiliating with and requesting the transaction account issuer to authorize the transaction, and communicate the approval or decline decision back to the virtual terminal system 134 of merchant system 130. In response to receiving the issuer's approval (or decline) on the transaction, the virtual terminal system 134 and/or the merchant system 130 will conclude the online purchase (e.g., notifying the consumer and/or arrange delivery plan).

In various embodiments, mobile POS terminal 122 and/or virtual terminal system 134 may be components of service system 140 integrated into web client 120 (i.e., the consumer device) and/or merchant system 130. Therefore, all functions and actions performed by mobile POS terminal 122 and/or virtual terminal system 134, as described herein, may be performed by service system 140 as a result of the integration between the web client 120 and service system 140, and between merchant system 130 and service system 140.

The various components in system 100 may be independently, separately or collectively suitably coupled to each other, and/or network 180, via data links which include, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

In various embodiments, the system and method may include alerting a subscriber (e.g., a user, consumer, etc.) when their device 120 (e.g., computer) is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface (i.e., comprised in device 120) for dynamically relocating/rescaling obscured textual information of an underlying window to become automatically viewable to the user. Such textual information may be comprised in merchant POS terminal 132, such as a merchant website or a physical payment terminal, a display screen on device 120 displaying personal POS terminal 122 and/or electronic wallet 124, and/or any other interface presented to the consumer or user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen (comprised in device 120, for example); displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user, and automatically returning the relocated scaled textual information, by the processor, to the first format within the first window when the overlap condition no longer exists.

In various embodiments, the system may also include isolating and removing malicious code from electronic messages (e.g., email) to prevent a computer, server, and/or system from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker, continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over consumers during affiliate purchase transactions, using a system for co-marketing the "look and feel" of the host web page (e.g., a merchant website of merchant system 130) with the product-related content information of the advertising merchant's web page. The system can be operated by a third-party outsource provider, who acts as a broker between multiple hosts and advertising merchants. Prior to implementation, a host places links to an advertising merchant's server on the host's web page (e.g., a merchant website). The links are associated with product-related content on the advertising merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A consumer who clicks on an advertising link is not transported from the host web page to the advertising merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the consumer as associated with the host web page. The server then transmits and presents this composite web page to the consumer so that she effectively remains on the host web page to purchase the item without being redirected to the third party advertising merchant affiliate. Because such composite pages are visually perceived by the consumer as associated with the host web page, they give the consumer the impression that she is viewing pages served by the host. Further, the consumer is able to purchase the item without being redirected to the third party advertising merchant affiliate, thus allowing the host to retain control over the consumer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of advertising merchants; and wherein the selected advertising merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a device identifier and (ii) a device. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944, 849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

Practitioners will appreciate that a device (e.g., a web client) may or may not be in direct contact with an application server. For example, a device may access the services of an application server through another server and/or hardware component, which may have a direct or indirect connection to an Internet server. For example, a device may communicate with an application server via a load balancer. In various embodiments, access is through a network or the Internet through a commercially-available web-browser software package.

As those skilled in the art will appreciate, a device includes an operating system (e.g., WINDOWS®/CE/Mobile, OS2, UNIX®, LINUX®, SOLARIS®, MacOS, etc.) as well as various conventional support software and drivers typically associated with computers. A device may include any suitable personal computer, network computer, workstation, personal digital assistant, cellular phone, smart phone, minicomputer, mainframe or the like. A device can be in a home or business environment with access to a network. In various embodiments, access is through a network or the Internet through a commercially available web-browser software package. A device may implement security protocols such as Secure Sockets Layer (SSL) and Transport Layer Security (TLS). A device may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header". "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or payment instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of device 120 may be further equipped with an Internet browser connected to the Internet or an intranet using standard dial-up, cable, DSL or any other Internet protocol known in the art. Transactions originating at a device (e.g., web client) may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial payment instrument may have electronic and communications functionality enabled, for example, by: a network of electronic circuitry that is printed or otherwise incorporated onto or within the payment instrument (and typically referred to as a "smart card"); a fob having a transponder and an RFID reader, and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial payment instrument," "payment instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Therefore, the following is claimed:

1. A method, comprising:
   receiving, by a service system that comprises a computing device, a transmission associated with a transaction from a merchant system, wherein the transmission comprises a merchant identifier associated with the merchant system participating in the transaction between the merchant system and a consumer mobile device;
   identifying, by the service system, the merchant identifier as a registered merchant associated with the service system based at least in part on the transmission for the transaction;
   establishing, by the service system, a first network connection between a virtual terminal system on the merchant system and the service system based at least in part on a communication configuration transmitted to the merchant system, wherein the virtual terminal system is configured, upon receiving an activation indication from the computing device, to display a user interface of the merchant system on the consumer mobile device for executing the transaction of an item;
   activating, by the service system, the virtual terminal system on the merchant system by transmitting the activation indication to the merchant system based at least in part on identifying the merchant identifier as the registered merchant associated with the transaction, the activation causes the virtual terminal system to display the user interface on the consumer mobile device and the user interface is configured to receive a device identifier from the consumer mobile device;

receiving, by the service system, the device identifier transmitted by the virtual terminal system through the first network connection, wherein the device identifier is associated with the consumer mobile device;

matching, by the service system, a stored device identifier from an information database with the device identifier, wherein the stored device identifier is used to identify a personal point of sale (POS) terminal executed on the consumer mobile device, wherein the personal POS terminal is configured to accept payment information upon activation from an electronic wallet executed on the consumer mobile device or from a physical payment instrument presented in close proximity to the consumer mobile device;

establishing, by the service system, a second network connection between the personal POS terminal and the service system in response to matching the stored device identifier with the device identifier;

activating, by the service system, the personal POS terminal on the consumer mobile device associated with the stored device identifier, wherein the personal POS terminal is activated in response to matching the stored device identifier with the device identifier, wherein the personal POS terminal is activated in order to generate a payment token for the transaction from the payment information provided and transmit the payment token to the service system through the second network connection;

receiving, by the service system, through the second network connection the payment token for the transaction from the personal POS terminal of the consumer mobile device; and communicating, by the service system, through the first network connection a transaction acceptance to the virtual terminal system of the merchant system based at least in part on an approval of the payment token for the transaction, the transaction acceptance comprising an instruction for the virtual terminal system to approve the transaction.

2. The method of claim 1, wherein the personal POS terminal comprises a payment instrument acceptance device (PIAD) equipped with functionality for communication with other devices via near field communication (NFC), and the personal POS terminal generated the payment token via the PIAD based at least in part on the physical payment instrument being placed in proximity to the consumer mobile device.

3. The method of claim 1, further comprising:
receiving, by the service system, an acceptance of the transaction from the personal POS terminal in an instance in which transaction details have been presented on the consumer mobile device; and
transmitting, by the service system, a second command to the consumer mobile device to display a request for the payment information for the transaction.

4. The method of claim 1, wherein establishing the second network connection is further based at least in part on retrieving a parameter setting associated with the consumer mobile device.

5. The method of claim 1, wherein establishing the second network connection is further based at least in part on retrieving a parameter setting associated with the personal POS terminal executed on the consumer mobile device.

6. The method of claim 1, wherein the activation of the personal POS terminal on the consumer mobile device further comprises transmitting a command to a port on the consumer mobile device.

7. The method of claim 6, wherein the command comprises an instruction to execute the personal POS terminal on the consumer mobile device, and the execution of the instruction causes the personal POS terminal to display a user interface component on the consumer mobile device.

8. The method of claim 1, wherein the payment information comprises a virtual payment instrument, and the virtual payment instrument is retrieved by the personal POS terminal from the electronic wallet.

9. A system, comprising: a computing device that includes a processor and a memory; and
machine-readable instructions stored in the memory that, when executed by the processor, cause the computing device to at least:
receive a transmission associated with a transaction from a merchant system, wherein the transmission comprises a merchant identifier associated with the merchant system participating the transaction between the merchant system and a consumer mobile device;
identify the merchant identifier as a registered merchant associated with the computing device based at least in part on the transmission for the transaction;
establish a first network connection between a virtual terminal system on the merchant system and the computing device, wherein the virtual terminal system is configured to display a user interface of the merchant system on the consumer mobile device for executing the transaction of an item;
activate the virtual terminal system on the merchant system by transmitting an activation indication to the merchant system based at least in part on the identification of the merchant identifier, the activation causes the virtual terminal system to display the user interface on the mobile device;
receive a device identifier from the virtual terminal system through the first network connection, wherein the device identifier is associated with the mobile device;
match a stored device identifier from an information database with the device identifier, wherein the stored device identifier is used to identify a personal point of sale (POS) terminal executed on the mobile device, wherein the personal POS terminal is configured to accept payment information upon activation from an electronic wallet executed on the consumer mobile device or from a physical payment instrument presented in close proximity to the mobile device;
establish a second network connection between the personal POS terminal and the computing device in response to matching the stored device identifier with the device identifier;
activate the personal POS terminal on the consumer mobile device associated with the stored device identifier, wherein the personal POS terminal is activated in response matching the stored device identifier with the device identifier, wherein the personal POS terminal is activated in order to generate a payment token for the transaction from the payment information provided and to transmit the payment token to the computing device through the second network connection;

receive the payment token for the transaction from the personal POS terminal of the consumer mobile device through the second network connection, wherein the payment token is generated by the personal POS terminal based at least in part on the payment information received from the mobile device; and communicate through the first network connection a transaction acceptance to the virtual terminal system of the merchant system based at least in part on an approval of the payment token for the transaction, the transaction acceptance comprising an instruction for the virtual terminal system to approve the transaction.

10. The system of claim 9, wherein the machine-readable instructions, when executed by the processor, cause the computing device to at least:

receive an acceptance of the transaction from the personal POS terminal in an instance in which transaction details have been presented on the mobile device; and transmit a second command to the consumer mobile device to display a request for the payment information for the transaction.

11. The system of claim 9, wherein establishing the second network connection is further based at least in part on retrieving a parameter setting associated with the personal POS terminal executed on the mobile device.

12. The system of claim 9, wherein the activation of the personal POS terminal on the consumer mobile device further comprises transmitting a command to a port on the mobile device.

13. The system of claim 12, wherein the command comprises an instruction to execute of the personal POS terminal on the mobile device, and the execution of the instruction causes the personal POS terminal to display a user interface component on the mobile device.

14. The system of claim 9, wherein the payment information comprises a virtual payment instrument, and the virtual payment instrument is retrieved by the personal POS terminal from the electronic wallet.

15. A non-transitory, computer-readable medium, comprising machine-readable instructions that, when executed by a processor of a computing device, cause the computing device to at least:

receive a transmission associated with a transaction from a merchant system, wherein the transmission comprises a merchant identifier associated with the merchant system participating in the transaction between the merchant system and a consumer mobile device;

identify the merchant identifier as a registered merchant associated with the computing device based at least in part on the transmission for the transaction;

establish a first network connection between a virtual terminal system executed on the merchant system and the computing device, wherein the virtual terminal system is configured to display a user interface of the merchant system on the consumer mobile device for executing the transaction of an item;

activate the virtual terminal system executed on the merchant system by transmitting an activation indication to the merchant system based at least in part on the identification of the merchant identifier, wherein the activation causes the virtual terminal system to display the user interface on the mobile device;

receive a device identifier transmitted by the virtual terminal system through the first network connection, wherein the device identifier is associated with the mobile device;

match a stored device identifier from an information database with the device identifier, wherein the stored device identifier is used to identify a personal point of sale (POS) terminal executed on the mobile device, wherein the personal POS terminal is configured to accept payment information upon activation from an electronic wallet executed on the consumer mobile device or from a physical payment instrument presented in close proximity to the mobile device;

establish a second network connection between the personal POS terminal and the computing device in response to matching the stored device identifier with the device identifier;

activate the personal POS terminal on the consumer mobile device associated with the stored device identifier, wherein the personal POS terminal is activated in response to matching the stored device identifier with the device identifier, wherein the personal POS terminal is activated in order to generate a payment token for the transaction from the payment information provided and transmit the payment token to the computing device through the second network connection;

receive the payment token for the transaction from the personal POS terminal of the consumer mobile device through the second network connection; and communicate through the first network connection a transaction acceptance to the virtual terminal system of the merchant system based at least in part on an approval of the payment token for the transaction, the transaction acceptance comprising an instruction for the virtual terminal system to approve the transaction.

16. The non-transitory, computer-readable medium of claim 15, wherein the personal POS terminal comprises a payment instrument acceptance device (PIAD) equipped with functionality for communication with other devices via near field communication (NFC), and the personal POS terminal generated the payment token via the PIAD based at least in part on the physical payment instrument being placed in proximity to the mobile device.

17. The non-transitory, computer-readable medium of claim 15, wherein the machine-readable instructions that, when executed by the processor of the computing device, cause the computing device to at least:

receive an acceptance of the transaction from the personal POS terminal in an instance in which transaction details have been presented on the mobile device; and transmit a second command to the consumer mobile device to display a request for the payment information for the transaction.

18. The non-transitory, computer-readable medium of claim 15, wherein the activation of the personal POS terminal on the consumer mobile device further comprises transmitting a command to a port on the mobile device.

19. The non-transitory, computer-readable medium of claim 15, wherein the payment token comprises merchant data, transaction data, and a unique identifier for a transaction account associated with the payment information.

20. The non-transitory, computer-readable medium of claim 15, wherein virtual terminal system is accessible to the consumer mobile device at a checkout page on a merchant website.

* * * * *